(12) United States Patent
Roy et al.

(10) Patent No.: US 11,377,552 B2
(45) Date of Patent: Jul. 5, 2022

(54) HARD-PHASE-MODIFIED THERMOPLASTIC POLYURETHANE

(71) Applicant: BASF SE, Ludwigshafen am Rhein (DE)

(72) Inventors: Nabarun Roy, Wyandotte, MI (US); Dirk Kempfert, Lemfoerde (DE); Oliver Muehren, Lemfoerde (DE); Alfons Bertels, Lemfoerde (DE); Sebastian Hartwig, Munich (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 17/420,451

(22) PCT Filed: Jan. 3, 2020

(86) PCT No.: PCT/EP2020/050084
§ 371 (c)(1),
(2) Date: Jul. 2, 2021

(87) PCT Pub. No.: WO2020/141218
PCT Pub. Date: Jul. 9, 2020

(65) Prior Publication Data
US 2022/0041861 A1    Feb. 10, 2022

(30) Foreign Application Priority Data

Jan. 4, 2019  (EP) .................................. 19150306

(51) Int. Cl.
| C08L 75/06 | (2006.01) |
| C08G 18/10 | (2006.01) |
| C08G 18/32 | (2006.01) |
| C08G 18/42 | (2006.01) |
| C08G 18/44 | (2006.01) |
| C08G 18/60 | (2006.01) |
| C08G 18/73 | (2006.01) |
| C08G 18/76 | (2006.01) |

(52) U.S. Cl.
CPC .............. *C08L 75/06* (2013.01); *C08G 18/10* (2013.01); *C08G 18/324* (2013.01); *C08G 18/4213* (2013.01); *C08G 18/4236* (2013.01); *C08G 18/44* (2013.01); *C08G 18/606* (2013.01); *C08G 18/73* (2013.01); *C08G 18/7657* (2013.01); *C08L 2203/12* (2013.01); *C08L 2203/16* (2013.01); *C08L 2203/18* (2013.01); *C08L 2203/20* (2013.01); *C08L 2203/30* (2013.01)

(58) Field of Classification Search
None
See application file for complete search history.

(56) References Cited

U.S. PATENT DOCUMENTS

| 4,401,801 A | 8/1983 | Pedain et al. |
| 5,410,009 A * | 4/1995 | Kato .................. C08G 18/5027 528/64 |
| 7,241,854 B2 | 7/2007 | Pohlmann et al. |
| 10,124,214 B1 | 11/2018 | Sullivan et al. |
| 10,450,445 B2 | 10/2019 | Tahir et al. |
| 2010/0016538 A1 | 1/2010 | Dubois et al. |
| 2016/0108167 A1* | 4/2016 | Kim .................... C08G 18/7671 525/450 |
| 2018/0223056 A1 | 8/2018 | Duke, Jr. et al. |
| 2018/0291141 A1* | 10/2018 | Yang .................... C08G 18/758 |

FOREIGN PATENT DOCUMENTS

| DE | 2 336 847 | 11/1999 |
| DE | 10 2013 217 661 | 3/2015 |
| EP | 0 073 389 | 3/1983 |
| EP | 0 191 915 | 8/1986 |
| EP | 1 529 814 | 5/2005 |
| EP | 1 419 188 | 2/2007 |

OTHER PUBLICATIONS

International Search Report dated Mar. 2, 2020 in PCT/EP2020/050084, with English Translation, 5 pages.
Written Opinion dated Mar. 2, 2020 in PCT/EP2020/050084, with English Translation, 8 pages.
Albemarle, "*Ethacure® Curative*", 2017, pp. 1-2.
International Preliminary Report on Patentability received for PCT Application No. PCT/EP2020/050084, dated Jul. 15, 2021, 7 pages.
Vieweg et al., "*Polyurethane*", Kunststoff-Handbuch, Band VII, 1966, pp. 103-113.

* cited by examiner

*Primary Examiner* — Christopher M Rodd
(74) *Attorney, Agent, or Firm* — Grüneberg and Myers PLLC

(57) ABSTRACT

A thermoplastic polyurethane can be obtained by a process involving a reaction of a thermoplastic polyester (PE-1) with a diamine (D1), to obtain a composition (Z1) containing an amide (PA-1), and a reaction of the obtained composition (Z1) with an isocyanate composition (I1), containing at least one polyisocyanate, and a polyol composition (P1). The diamine (D1) has a molecular weight in the range from 50 g/mol to 700 g/mol. A process can produce such a thermoplastic polyurethane, and shaped articles can be made containing the thermoplastic polyurethane.

16 Claims, No Drawings

HARD-PHASE-MODIFIED THERMOPLASTIC POLYURETHANE

CROSS-REFERENCE TO RELATED APPLICATIONS

This application is the National Stage entry under § 371 of International Application No. PCT/EP2020/050084, filed on Jan. 3, 2020, and which claims the benefit of priority to European Application No. 19150306.9, filed on Jan. 4, 2019. The content of each of these applications is hereby incorporated by reference in its entirety.

BACKGROUND OF THE INVENTION

Field of the Invention

The present invention relates to a thermoplastic polyurethane obtainable or obtained by a process comprising reaction of a thermoplastic polyester (PE-1) with a diamine (D1) to obtain a composition (Z1) comprising an amide (PA-1) and to the reaction of the obtained composition (Z1) with an isocyanate composition (I1) comprising at least one polyisocyanate and a polyol composition (P1), wherein the diamine (D1) has a molecular weight in the range from 50 g/mol to 700 g/mol. The present invention further relates to a process for producing such a thermoplastic polyurethane and to shaped articles comprising a thermoplastic polyurethane according to the invention.

Description of Related Art

Thermoplastic polyurethanes are well known on account of their good mechanical properties, high abrasion resistance and high elasticity. They therefore often find use in a very wide variety of applications. Thermoplastic polyurethanes are also widely employed in the automotive sector. For individual applications, for example for use for charging cables for hybrid and electric vehicles, a high thermal stability is required. Applicable standards for cables in automotive applications are LV 112 and ISO 6722 which classify the materials according to certain temperature classes.

For novel applications the manufacturers often select cables of temperature class D which are suitable for temperatures up to 150° C. for engine-proximal applications. Examples include engine wiring harnesses or transmission connections. Electric and hybrid vehicles place particularly high demands on the wiring harness and conduits which bear only limited similarity to onboard electrical systems that have hitherto been customary. These cables must accordingly withstand markedly higher temperatures than their predecessors as a consequence of high voltages of up to 1000 V and correspondingly high currents. The cables must withstand the customary winding test after 3000 h of hot air aging at 150° C.

For temperature class D (up to 150° C.) inter alia ethylene-tetrafluoroethylene copolymers (ETFE) are employed. However, the use of ETFE results in the formation of corrosive gases in the event of fire, thus often limiting the application of these materials.

Special crosslinked polyolefin compounds are a further material. However, the crosslinked polyolefin compounds are producible only with great complexity and at great cost due to the required subsequent crosslinking by irradiation or vulcanization and are often at their limits in terms of chemical resistance and low mechanical resilience. The crosslinked materials also have the disadvantage that they are not recyclable and cause problems with watertightness when molding plugs and grommet.

The now predominantly applied standard LV 112 also entails tougher requirements in terms of hydrolysis resistance at high temperatures. While ISO 6722 demands service lives of 1000 to 3000 hours at 85° C. and 85% relative humidity, LV 112 mandates a service life of 3000 hours.

The remaining requirements for cable sheathings are largely identically regulated in both regulations and are nowadays standard among the materials marketed therefor. These include insensitivity to cold, media resistance and inhibition of fungal growth as well as compatibility with further materials in the wiring harness such as adhesive tapes, shrink tubing and connectors.

However, for many applications there are no materials available which combine good mechanical properties with the particular requirements of automotive applications. Many conventional thermoplastic polyurethanes also decompose under these stresses.

SUMMARY OF THE INVENTION

The present invention accordingly has for its object to provide thermoplastic polyurethanes which exhibit good mechanical properties and high thermal stability.

This object is achieved according to the invention by a thermoplastic polyurethane obtainable or obtained by a process comprising reaction of an isocyanate composition (I1) comprising at least one polyisocyanate and a polyol composition (P1), wherein at least one diamine (D1) having a molecular weight in the range from 50 g/mol to 700 g/mol is employed.

According to the invention the diamine (D1) may be employed in the process as such, for example as a chain extender, or may be reacted with a thermoplastic polyester (PE-1) to afford an amide (PA-1) before reaction with the isocyanate composition (I1) and the polyol composition (P1).

In a further embodiment the present invention thus also provides a thermoplastic polyurethane as described hereinabove, wherein the diamine D1 is reacted with a thermoplastic polyester (PE-1) to afford an amide (PA-1) before reaction with the isocyanate composition (I1) and the polyol composition (P1).

This object is thus also achieved according to the invention by a thermoplastic polyurethane obtainable or obtained by a process comprising reaction of an isocyanate composition (I1) comprising at least one polyisocyanate and a polyol composition (P1), wherein at least one diamine (D1) having a molecular weight in the range from 50 g/mol to 700 g/mol is reacted with a thermoplastic polyester (PE-1) to afford an amide (PA-1) before reaction with the isocyanate composition (I1) and the polyol composition (P1).

DETAILED DESCRIPTION OF THE INVENTION

The present invention thus also provides a thermoplastic polyurethane obtainable or obtained by a process comprising the steps (i) and (ii)
 (i) reaction of a thermoplastic polyester (PE-1) with a diamine (D1) to obtain a composition (Z1) comprising an amide (PA-1), (ii) reaction of the composition (Z1) obtained according to step (i) with an isocyanate composition (I1) comprising at least one polyisocyanate and a polyol composition (P1), wherein the diamine (D1) has a molecular weight in the range from 50 g/mol to 700 g/mol.

In an alternative embodiment the present invention also provides a thermoplastic polyurethane as described hereinabove, wherein the diamine (D1) is employed as a chain extender.

In a further embodiment the present invention thus also provides a thermoplastic polyurethane as described hereinabove, wherein the process comprises the reaction of the components (a) to (c):
(a) the isocyanate composition (I1) comprising at least one polyisocyanate,
(b) the polyol composition (P1) and
(c) the diamine (D1) as a chain extender.

Provided the diamine (D1) is employed as a chain extender the process may be performed under commonly used conditions. Particularly suitable chain extenders are diamines (D1) selected from the compounds of general formula (I) or (II):

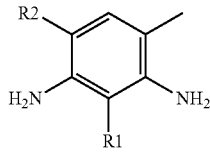

(I)

wherein R1 and R2 are independently of one another selected from the group consisting of O—$CH_3$, $CH_2CH_3$, S—$CH_3$, NH—$CH_3$, N($CH_3$)$_2$ and H,
or

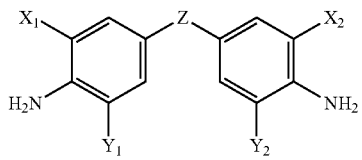

(II)

wherein
a) $X_1$=$X_2$=$Y_1$=$Y_2$=H,
b) $X_1$=$Y_1$=$Y_1$=$CH_3$
c) $X_1$=$X_2$=$Y_1$=$Y_2$=isopropyl
d) $X_1$=$X_2$=$Y_1$=$Y_2$=$C_2H_5$,
e) $X_1$=$X_2$=$Y_1$=$Y_2$=butyl
f) $X_1$=$X_1$=$Y_1$=$Y_2$=tert-butyl,
g) $X_1$=$X_2$=H and $Y_1$=$Y_2$=$CH_2$,
h) $X_1$=$X_2$=H and $Y_1$=$Y_2$=isopropyl
i) $X_1$=$X_2$=H and $Y_1$=$Y_2$=$C_2H$,
j) $X_1$=$X_2$=H and $Y_1$=$Y_2$=butyl or
k) $X_1$=$X_2$=H and $Y_1$=$Y_2$=tert-butyl
and Z is selected from the group consisting of $CH_2$, $CHCH_3$, $C(CH_3)_2$, O and S.

The present invention thus also provides a thermoplastic polyurethane obtainable or obtained by a process comprising reaction of an isocyanate composition (I1) comprising at least one polyisocyanate and a polyol composition (P1).

wherein at least one diamine (D1) having a molecular weight in the range from 50 g/mol to 700 g/mol is employed, selected from compounds of general formula (I) or (II):

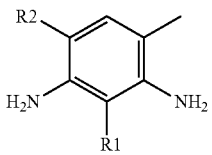

(I)

wherein R1 and R2 are independently of one another selected from the group consisting of O—$CH_3$, $CH_2CH_3$, S—$CH_3$, NH—$CH_3$, N($CH_3$)$_2$ and H,
or

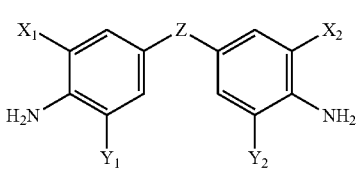

(II)

wherein
a) $X_1$=$X_2$=$Y_1$=$Y_2$=H,
b) $X_1$=$X_2$=$Y_1$=$Y_2$=$CH_3$
c) $X_1$=$X_2$=$Y_1$=$Y_2$=isopropyl
d) $X_1$=$X_2$=$Y_1$=$Y_2$=$C_2H_5$,
e) $X_1$=$X_2$=$Y_1$=$Y_2$=butyl
f) $X_1$=$X_2$=$Y_1$=$Y_2$=tert-butyl,
g) $X_1$=$X_2$=H and $Y_1$=$Y_2$=$CH_3$,
h) $X_1$=$X_2$=H and $Y_1$=$Y_2$=isopropyl
i) $X_1$=$X_2$=H and $Y_1$=$Y_2$=$C_2H_5$
j) $X_1$=$X_2$=H and $Y_1$=$Y_2$=butyl or
k) $X_1$=$X_2$=H and $Y_1$=$Y_2$=tert-butyl
and Z is selected from the group consisting of $CH_2$, $CHCH_3$, $C(CH_3)_2$, O and S.

In one embodiment the process according to the invention comprises the steps (i) and (ii) in particular. In step (i) a thermoplastic polyester (PE-1) is reacted with a diamine (D1) to obtain a composition (Z1) comprising an amide (PA-1), wherein the diamine (D1) has a molecular weight in the range from 50 g/mol to 700 g/mol. In step (ii) of the process according to the invention the composition (Z1) obtained according to step (i) is reacted with an isocyanate composition (I1) comprising at least one polyisocyanate and a polyol composition (P1).

The process mode according to the invention makes it possible to obtain thermoplastic polyurethanes comprising a modified hard phase. It has surprisingly been found that the specific stepwise reaction of the components makes it possible to obtain thermoplastic polyurethanes exhibiting good mechanical properties and high thermal stability. This makes it especially suitable for use as cable sheathings. It is further advantageous for many applications in the field of cable sheathings that shaped articles produced from the thermoplastic polyurethanes according to the invention by means of extrusion or injection molding exhibit a matt surface.

The reaction according to step (i) is preferably carried out in continuous fashion. In a further embodiment the present invention thus provides a process for producing a thermoplastic polyurethane as described hereinabove, wherein the reaction according to step (i) is carried out in continuous fashion.

According to step (i) the thermoplastic polyester (PE-1) is with the diamine (D1). In the context of the present invention this forms an amide. Diamine (D1) may in principle be selected from any commonly used diamines having a molecular weight in the range from 50 g/mol to 700 g/mol, preferably in the range from 50 to 500 g/mol. Aliphatic or aromatic diamines are suitable for example. Aromatic diamines are preferred according to the invention.

It has proven especially advantageous to employ diamines having aromatic structures. Preferably employed in the context of the present invention are diamines (D1) selected from compounds of general formula (I) or (II):

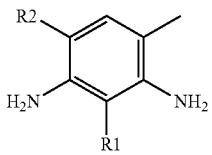
(I)

wherein R1 and R2 are independently of one another selected from the group consisting of O—CH$_3$, CH$_2$CH$_3$, S—CH$_3$, NH—CH$_3$, N(CH$_3$)$_2$ and H, or

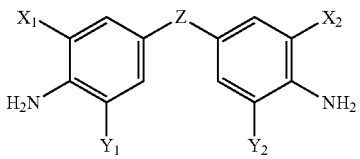
(II)

wherein
a) X$_1$=X$_2$=Y$_1$=Y$_2$=H,
b) X$_1$=X$_2$=Y$_1$=Y$_2$=CH$_3$
c) X$_1$=X$_2$=Y$_1$=Y$_2$=isopropyl
d) X$_1$=X$_2$=Y$_1$=Y$_2$=C$_2$H$_5$,
e) X$_1$=X$_2$=Y$_1$=Y$_2$=butyl
f) X$_1$=X$_2$=Y$_1$=Y$_2$=tert-butyl,
g) X$_1$=X$_2$=H and Y$_1$=Y$_2$=CH$_3$,
h) X$_1$=X$_2$=H and Y$_1$=Y$_2$=isopropyl
i) X$_1$=X$_2$=H and Y$_1$=Y$_2$=C$_2$H$_5$
j) X$_1$=X$_2$=H and Y$_1$=Y$_2$=butyl or
k) X$_1$=X$_2$=H and Y$_1$=Y$_2$=tert-butyl
and Z is selected from the group consisting of CH$_2$, CHCH$_3$, C(CH$_3$)$_2$, O and S.

In the context of the present invention it is particularly preferable to employ a diamine (D1) having general formula (III):

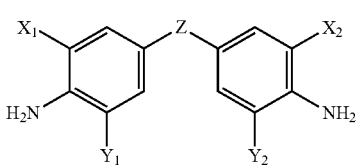
(II)

wherein
a) X$_1$=X$_2$=Y$_1$=Y$_2$=H,
b) X$_1$=X$_2$=Y$_1$=Y$_2$=CH$_3$
c) X$_1$=X$_2$=Y$_1$=Y$_2$=isopropyl
d) X$_1$=X$_2$=Y$_1$=Y$_2$=C$_2$H$_5$,
e) X$_1$=X$_2$=Y$_1$=Y$_2$=butyl
f) X$_1$=X$_2$=Y$_1$=Y$_2$=tert-butyl,
g) X$_1$=X$_2$=H and Y$_1$=Y$_2$=CH$_3$,
h) X$_1$=X$_2$=H and Y$_1$=Y$_2$=isopropyl
i) X$_1$=X$_2$=H and Y$_1$=Y$_2$=C$_2$H$_5$
j) X$_1$=X$_2$=H and Y$_1$=Y$_2$=butyl or
k) X$_1$=X$_2$=H and Y$_1$=Y$_2$=tert-butyl
and Z is selected from the group consisting of CH$_2$, CHCH$_3$, C(CH$_3$)$_2$, O and S.

In a further embodiment the present invention thus provides a thermoplastic polyurethane as described hereinabove, wherein the diamine (D1) is selected from compounds of general formula (I) or (II):

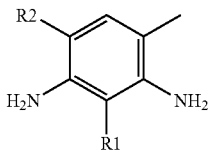
(I)

wherein R1 and R2 are independently of one another selected from the group consisting of O—CH$_3$, CH$_2$CH$_3$, S—CH$_3$, NH—CH$_3$, N(CH$_3$)$_2$ and H, or

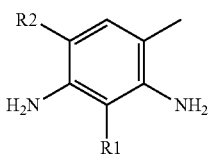
(I)

wherein R1=R2=S—CH$_3$ or R1=R2=CH$_2$CH$_3$.

In a further embodiment the present invention thus provides a thermoplastic polyurethane as described hereinabove, wherein the diamine (D1) has the general formula (III):

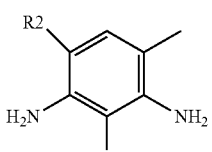
(III)

wherein R1=R2=S—CH$_3$ or R1=R2=CH$_2$CH$_3$.

Mixtures of the recited diamines may also be employed in the context of the present invention.

According to step (i) a thermoplastic polyester (PE-1) is employed. Thermoplastic polyesters suitable according to the invention are known per se. Suitable polyesters are constructed from at least one dicarboxylic acid and at least one suitable dihydroxy compound. The polyesters may be produced for example by polycondensation of aliphatic or aromatic dicarboxylic acids or mixtures of aromatic and aliphatic and/or cycloaliphatic dicarboxylic acids and the corresponding ester-forming derivatives, for example dicarboxylic anhydrides, mono- and/or diesters advantageously having not more than 4 carbon atoms in the alcohol radical, with aliphatic dihydroxy compounds at elevated temperatures, for example from 160° C. to 260° C., in the presence or absence of esterification catalysts.

Suitable according to the invention are aromatic dicarboxylic acids, for example naphthalene dicarboxylic acids, isophthalic acid and in particular terephthalic acid or mixtures of these dicarboxylic acids. Also suitable in the context of the present invention are aliphatic and/or cycloaliphatic dicarboxylic acids, for example having 4 to 14 carbon atoms, for example, succinic, adipic, azelaic, sebacic, dodecanedioic and/or cyclohexanedicarboxylic acid.

Also employable according to the invention are polyester-functionalized dicarboxylic acids, for example lactic acid-based polyesters.

Employable in the context of the present invention as a further synthesis component of the thermoplastic polyesters (PE-1) are aliphatic or aromatic dihydroxy compounds. Contemplated aliphatic dihydroxy compounds are preferably alkanediols having 2 to 6 carbon atoms and cycloalkanediols having 5 to 7 carbon atoms. Recited by way of example and preferably employed are 1,2-ethanediol, 1,3-propanediol, 1,4-butanediol, 1,6-hexanediol, neopentyl glycol and 1,4-cyclohexanediol or mixtures of at least two of the recited diols.

Especially suitable thermoplastic polyesters are thermoplastic polyester selected from the group consisting of polyalkylene terephthalates and poly-L-lactic acid.

In a further embodiment the present invention also provides a thermoplastic polyurethane as described hereinabove, wherein the thermoplastic polyester (PE-1) is selected from the group consisting of polyalkylene terephthalates and poly-L-lactic acid.

According to the invention suitable molecular weight ranges (Mn) of the employed polyester are in the range from 2000 to 100 000, particularly preferably in the range from 10 000 to 50 000.

In a further embodiment the present invention also provides a thermoplastic polyurethane as described hereinabove, wherein the thermoplastic polyester (PE-1) has a molecular weight in the range from 1000 g/mol to 60 000 g/mol, for example also in the range from 1500 g/mol to 5000 g/mol.

In the context of the present invention determination of the weight-average molecular weights Mw of the thermoplastic polyesters is carried out dissolved in HFIP (hexafluorisopropanol) by GPC unless otherwise stated. The molecular weight is determined using two GPC columns arranged in series (PSS-Gel; 100 A; 5μ; 300*8 mm, Jordi-Gel DVB; mixed bed; 5μ; 250*10 mm; column temperature 60° C.; flow 1 ml/min; RI detector). Calibration is performed here with polymethyl methacrylate (EasyCal; from PSS, Mainz) and HFIP is used as eluent.

For example the proportion of the diamine based on the employed polyester may be in the range from 5% to 20%.

Step (i) affords a composition (Z1) comprising an amide (PA-1). In the context of the present invention the composition (Z1) may comprise further components, for example unconverted thermoplastic polyester or unconverted diamine. The composition (Z1) is typically a mixture which in addition to the amide (PA-1) may also comprise unconverted polyester (PE-1) or unreacted diamine. According to the invention the amide (PA-1) is thus present as a mixture, wherein the individual molecules may differ for example in terms of the distribution and the length of the polyester blocks.

The reaction conditions in the reaction according to step (i) are preferably chosen such that the amide (PA-1) has a free amine functionality and a free OH functionality.

The composition preferably comprises the amide (PA-1) and further components such as catalysts or additives, for example such as waxes, stabilizers and fillers. Additives are typically present in the composition in an amount in the range of up to 5%.

The reaction according to step (ii) is carried out under suitable conditions which allow reaction of the diisocyanate with the free reactive groups of the amide (PA-1). According to the invention the reaction may be carried out in a suitable apparatus, wherein suitable processes are known per se to those skilled in the art. It is also possible according to the invention to employ additives or assistants to accelerate/to improve the reaction according to step (i) or (ii). In particular, catalysts may be used.

Suitable catalysts for the reaction according to step (i) are known per se to those skilled in the art. A catalyst may be employed in an amount in the range from 10 to 200 ppm for example.

The reaction according to step (i), the reaction according to step (ii) or the reaction according to step (i) and step (ii) may in particular be carried out in an extruder.

The reaction according to step (i) may be carried out for example at a temperature in the range from 200° C. to 310° C. preferably in the range from 220° C. to 300° C. and in particular from 220° C. to 280° C., more preferably from 230° C. to 270° C., and a residence time of 10 seconds to 30 minutes, preferably 15 seconds to 10 minutes, in for example a flowable, softened or preferably molten state of the polyester and the diamine, in particular by stirring, rolling, kneading or preferably extruding, for example using customary plasticizing apparatuses, for example mills, kneaders or extruders, preferably in an extruder.

The process according to the invention may comprise further steps, for example temperature adjustments or shaping steps.

The composition (Z1) is then reacted with an isocyanate composition (I1) and a polyol composition (P1) according to step (ii).

According to the invention the polyol composition (P1) comprises at least one polyol, in particular at least one polycarbonate polyol (PC1).

Suitable polycarbonate polyols are known per se to those skilled in the art. In the context of the present invention aliphatic polycarbonate diols in particular are suitable. Suitable polycarbonate diols include for example polycarbonate diols based on alkanediols. Suitable polycarbonate diols are strictly difunctional OH-functional polycarbonate diols, preferably strictly difunctional OH-functional aliphatic polycarbonate diols. Suitable polycarbonate diols are for example based on butanediol, pentanediol or hexanediol, especially 1,4-butanediol, 1,5-pentanediol, 1,6-hexanediol, 3-methylpentane-(1,5)-diol or mixtures thereof, particularly preferably 1,4-butanediol, 1,5-pentanediol, 1,6-hexanediol or mixtures thereof. Preferably employed in the context of the present invention are polycarbonate diols based on butanediol and hexanediol, polycarbonate diols based on pentanediol and hexanediol, polycarbonate diols based on hexanediol and mixtures of two or more of these polycarbonate diols.

In a further embodiment the present invention also provides a thermoplastic polyurethane as described hereinabove, wherein the at least one polycarbonate polyol (PC1) is selected from the group consisting of polycarbonate diols based on butanediol and hexanediol, polycarbonate diols based on pentanediol and hexanediol, polycarbonate diols based on hexanediol and mixtures of two or more of these polycarbonate diols.

The polycarbonatediols employed preferably have a number-average molecular weight Mn in the range from 500 to 4000 determined by GPC, preferably in the range from 650 to 3500 determined by GPC, more preferably in the range from 800 to 3000 determined by GPC.

In a further embodiment the present invention also provides a thermoplastic polyurethane as described hereinabove, wherein the at least one polycarbonate polyol (PC1) has a number-average molecular weight Mn in the range from 500 to 4000 determined by GPC.

According to the invention the polyol composition (P1) may comprise further polyols. Suitable polyols are known in principle to those skilled in the art and described for example in "Kunststoffhandbuch [Plastics Handbook], volume 7, Polyurethane [Polyurethanes]". Carl Hanser Verlag, 3rd edition 1993, chapter 3.1. Particular preference is given to using polyesterols or polyetherols as polyols. Particular preference is given to polyeter polyols. The number-average molecular weight of the polyols employed according to the invention is preferably between 500 g/mol and 3000 g/mol, preferably between 600 g/mol and 2500 g/mol, in particular between 650 g/mol and 2000 g/mol.

According to the invention preferred polyetherols are polyethylene glycols, polypropylene glycols and polytetrahydrofurans.

According to the invention the polyol composition may also comprise a solvent, for example. Suitable solvents are known per se to those skilled in the art.

In the context of the present invention the reaction may also employ additives or assistants in the polyol composition, for example antioxidants, UV absorbers, UV filters, antihydrolysis agents, waxes, lubricants, plasticizers, processing aids, nucleating agents, fillers, flame retardants.

According to the invention at least one isocyanate composition (I1) comprising at least one polyisocyanate is employed. The polyisocyanate employed is preferably a diisocyanate. Mixtures of two or more diisocyanates may also be employed in accordance with the invention. Preferred diisocyanates are in the context of the present invention in particular aliphatic or aromatic diisocyanates.

Preferably employed isocyanates include aliphatic, cycloaliphatic, araliphatic and/or aromatic isocyanates, more preferably tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or -2,6-cyclohexane diisocyanate and/or 4,4'-, 2,4'- and 2,2'-dicyclohexylmethane diisocyanate, 2,2'-, 2,4'- and/or 4,4'-diphenylmethane diisocyanate (MDI), 1,5-naphthylene diisocyanate (NDI), 2,4- and/or 2,6-tolylene diisocyanate (TDI), diphenylmethane diisocyanate, 3,3'-dimethyl diphenyl diisocyanate, 1,2-diphenylethane diisocyanate and/or phenylene diisocyanate. Particular preference is given to using 4,4'-MDI.

Aliphatic diisocyanates employed are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylene dicyclohexyl 4,4'-, 2,4'- and/or 2,2'-diisocyanate (H12MDI).

In a further embodiment the present invention also provides a thermoplastic polyurethane as described hereinabove, wherein the polyisocyanate is selected from the group consisting of methylene diphenyl diisocyanate and aliphatic diisocyanates and diphenylmethane diisocyanate (MDI).

According to the invention the isocyanate composition may be employed in pure form or in the form of a composition comprising the diisocyanate and at least one solvent. Suitable solvents are known to those skilled in the art. Suitable examples are nonreactive solvents such as ethyl acetate, methyl ethyl ketone, tetrahydrofuran and hydrocarbons.

According to the invention further input materials, for example catalysts or auxiliary and additive substances, may be added during the reaction according to step (ii).

Catalysts which in particular accelerate the reaction between the NCO groups and the hydroxyl groups of the isocyanate-reactive compounds are for example tertiary amines, especially triethylamine, dimethylcyclohexylamine, N-methylmorpholine, N,N'-dimethylpiperazine, 2-(dimethylaminoethoxy)ethanol, diazabicyclo[2.2.2]octane; in another preferred embodiment, these are organic metal compounds such as titanate esters, iron compounds, preferably iron (III) acetylacetonate, tin compounds, preferably tin diacetate, tin dioctoate, tin dilaurate or the dialkyltin salts of aliphatic carboxylic acids, preferably dibutyltin diacetate, dibutyltin dilaurate, or bismuth salts in which bismuth is preferably in oxidation states 2 or 3, especially 3. Salts of carboxylic acids are preferred. Carboxylic acids employed are preferably carboxylic acids having 6 to 14 carbon atoms, particularly preferably having 8 to 12 carbon atoms. Examples of suitable bismuth salts are bismuth (III) neodecanoate, bismuth 2-ethylhexanoate and bismuth octanoate.

The catalysts are preferably employed in amounts of 0.0001 to 0.1 parts by weight per 100 parts by weight of the isocyanate-reactive compound (b). Preference is given to using tin catalysts, especially tin dioctoate.

The catalysts are typically used in amounts of 3 ppm to 2000 ppm, preferably 10 ppm to 1200 ppm, more preferably 20 ppm to 1000 ppm and most preferably 30 ppm to 800 ppm.

In addition to catalysts customary assistants may also be added to the reaction according to step (ii). Examples include surface-active substances, fillers, further flame retardants, nucleation agents, oxidation stabilizers, lubrication and demolding aids, dyes and pigments, optionally stabilizers, for example against hydrolysis, light, heat or discoloration, inorganic and/or organic fillers, reinforcers and plasticizers. Suitable auxiliary and additive substances may be found for example in Kunststoffhandbuch, volume VII, edited by Vieweg and Höchtlen, Carl Hanser Verlag, Munich 1966 (p. 103-113).

A thermoplastic polyurethane is obtained according to the invention. The properties of the thermoplastic polyurethane according to the invention may be varied within wide ranges. The thermoplastic polyurethane by preference has a Shore hardness in the range from 45 A to 78 D, preferably a Shore hardness in the range from 80 A to 70 D, particularly preferably a Shore hardness in the range from 70 A to 64 D, more preferably in the range from 70 A to 98 A.

In a further embodiment the present invention also provides a thermoplastic polyurethane as described hereinabove, wherein the thermoplastic polyurethane has a Shore hardness in the range from Shore 45 A to Shore 78 D.

In a further aspect the present invention also provides a process for producing a thermoplastic polyurethane comprising reaction of an isocyanate composition (I1) comprising at least one polyisocyanate and a polyol composition (P1), wherein at least one diamine (D1) having a molecular weight in the range from 50 g/mol to 700 g/mol is employed.

The present invention thus also provides a process for producing a thermoplastic polyurethane comprising reaction of an isocyanate composition (I1) comprising at least one polyisocyanate and a polyol composition (P1),
wherein at least one diamine (D1) having a molecular weight in the range from 50 g/mol to 700 g/mol is reacted with a thermoplastic polyester (PE-1) to afford an amide (PA-1) before reaction with the isocyanate composition (I1) and the polyol composition (P1).

In particular the present invention also relates to a process for producing a thermoplastic polyurethane comprising the steps (i) and (ii)
(i) reaction of a thermoplastic polyester (PE-1) with a diamine (D1) to obtain a composition (Z1) comprising an amide (PA-1),
(ii) reaction of the composition (Z1) obtained according to step (i) with an isocyanate composition (I1) comprising at least one polyisocyanate and a polyol composition (P1), wherein the diamine (D1) has a molecular weight in the range from 50 g/mol to 700 g/mol.

The present invention thus further provides a process for producing a thermoplastic polyurethane comprising reaction of an isocyanate composition (I1) comprising at least one polyisocyanate and a polyol composition (P1) comprising the steps (i) and (ii):
(i) reaction of a thermoplastic polyester (PE-1) with a diamine (D1) to obtain a composition (Z1) comprising an amide (PA-1),
(ii) reaction of the composition (Z1) obtained according to step (i) with an isocyanate composition (I1) comprising at least one polyisocyanate and a polyol composition (P1), wherein the diamine (D1) has a molecular weight in the range from 50 g/mol to 700 g/mol.

In an alternative embodiment the present invention relates to a process for producing a thermoplastic polyurethane comprising reaction of the components (a) to (c):
(a) the isocyanate composition (I1) comprising at least one polyisocyanate,
(b) the polyol composition (P1) and
(c) the diamine (D1) as a chain extender.

Having regard to preferred embodiments reference is made to the abovementioned elucidations.

The present invention further provides a composition comprising a thermoplastic polyurethane according to the invention. In the context of the present invention the composition may comprise further components such as for example fillers, glass fibers, plasticizers or flame retardants. The composition may comprise one or more of the recited components.

The present invention further provides for the use of a thermoplastic polyurethane according to the invention as described hereinabove for the production of coatings, damping elements, bellows, films or fibers, shaped articles, flooring for buildings and transport, nonwoven fabrics, preferably seals, wheels/rollers, shoe soles, hoses, cables, cable connectors, cable sheathings, cushions, laminates, profiles, belts, saddles, foams, plug connectors, trailing cables, solar modules, automotive trim. Use for the production of cable sheathings is preferred. Production is preferably carried out from pellet materials by injection molding, calendering, powder sintering or extrusion and/or by additional foaming of the composition according to the invention.

In a further aspect the present invention also provides a shaped article comprising a thermoplastic polyurethane as described hereinabove or a thermoplastic polyurethane obtainable or obtained by a process as described hereinabove. The shaped article according to the invention may be for example films, moldings, wheels/rollers, fibers, automotive trim, hoses, cable plugs, bellows, trailing cables, cable sheathings, seals, belts or damping elements.

On account of their good mechanical properties and good thermal characteristics the thermoplastic polyurethanes according to the invention and the compositions according to the invention are suitable in particular for producing films, moldings, wheels/rollers, fibers, automotive trim, hoses, cable plugs, bellows, trailing cables, cable sheathings, seals, belts or damping elements.

The present invention thus also provides films, moldings, wheels/rollers, fibers, automotive trim, hoses, cable plugs, bellows, trailing cables, cable sheathings, seals, belts or damping elements comprising a thermoplastic polyurethane as described hereinabove or a composition as described hereinabove.

In a further embodiment the present invention also provides a shaped article as described hereinabove, wherein the shaped article is selected from films, moldings, wheels/rollers, fibers, automotive trim, hoses, cable plugs, bellows, trailing cables, cable sheathings, seals, belts or damping elements.

Further embodiments of the present invention may be found in the examples. It will be appreciated that the features of the subject matter/processes/uses according to the invention recited above and elucidated below may be used not only in the combination specified in each case but also in other combinations without departing from the scope of the invention. Thus for example the combination of a preferred feature with a particularly preferred feature or of a not further characterized feature with a particularly preferred feature etc. is also implicitly comprehended even if this combination is not explicitly mentioned.

Exemplary embodiments of the present invention are recited hereinbelow but are in no way intended to limit the present invention. The present invention especially also comprehends embodiments resulting from the dependency references and thus combinations specified hereinbelow.

1. Thermoplastic polyurethane obtainable or obtained by a process comprising reaction of an isocyanate composition (I1) comprising at least one polyisocyanate and a polyol composition (P1),
    wherein at least one diamine (D1) having a molecular weight in the range from 50 g/mol to 700 g/mol is employed.
2. Thermoplastic polyurethane according to embodiment 1, wherein the diamine D1 is reacted with a thermoplastic polyether (PE-1) to afford an amide (PA-1) before reaction with the isocyanate composition (I1) and the polyol composition (P1).
3. Thermoplastic polyurethane according to either of embodiments 1 or 2, wherein the process comprises the steps (i) and (ii):

(i) reaction of a thermoplastic polyester (PE-1) with a diamine (D1) to obtain a composition (Z1) comprising an amide (PA-1).
(ii) reaction of the composition (Z1) obtained according to step (i) with an isocyanate composition (I1) comprising at least one polyisocyanate and a polyol composition (P1),
wherein the diamine (D1) has a molecular weight in the range from 50 g/mol to 700 g/mol.

4. Thermoplastic polyurethane according to embodiment 1, wherein the diamine (D1) is employed as a chain extender.

5. Thermoplastic polyurethane according to embodiment 4, wherein the process comprises the reaction of the components (a) to (c):
  (a) the isocyanate composition (I1) comprising at least one polyisocyanate,
  (b) the polyol composition (P1) and
  (c) the diamine (D1) as a chain extender.

6. Thermoplastic polyurethane according to any of embodiments 1 to 5, wherein the diamine (D1) is selected from compounds of general formula (I) or (II):

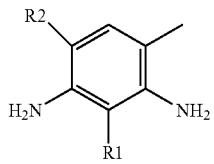
(I)

wherein R1 and R2 are independently of one another selected from the group consisting of O—CH$_3$, CH$_2$CH$_3$, S—CH$_3$, NH—CH$_3$, N(CH$_3$)$_2$ and H,
or

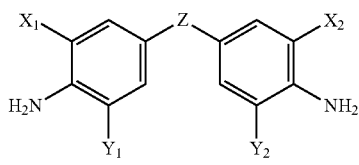
(II)

wherein
a) X$_1$=X$_2$=Y$_1$=Y$_2$=H,
b) X$_1$=X$_2$=Y$_1$=Y$_2$=CH$_3$
c) X$_1$=X$_2$=Y$_1$=Y$_2$=isopropyl
d) X$_1$=X$_2$=Y$_1$=Y$_2$=C$_2$H$_5$,
e) X$_1$=X$_2$=Y$_1$=Y$_2$=butyl
f) X$_1$=X$_2$=Y$_1$=Y$_2$=tert-butyl,
g) X$_1$=X$_2$=H and Y$_1$=Y$_2$=CH$_3$,
h) X$_1$=X$_2$=H and Y$_1$=Y$_2$=isopropyl
i) X$_1$=X$_2$=H and Y$_1$=Y$_2$=C$_2$H$_5$
j) X$_1$=X$_2$=H and Y$_1$=Y$_2$=butyl or
k) X$_1$=X$_2$=H and Y$_1$=Y$_2$=tert-butyl
and Z is selected from the group consisting of CH$_2$, CHCH$_3$, C(CH$_3$)$_2$, O and S.

7. Thermoplastic polyurethane according to any of embodiments 1 to 6, wherein the diamine (D1) has the general formula (III):

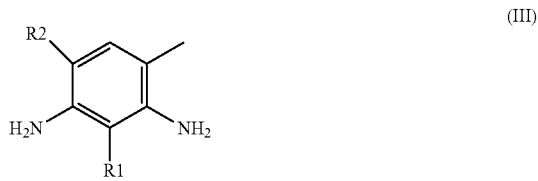
(III)

wherein R1=R2=S—CH$_3$ or R1=R2=CH$_2$CH$_3$.

8. Thermoplastic polyurethane according to any of embodiments 1 to 7, wherein the polyol composition (P1) comprises at least one polycarbonate polyol (PC1).

9. Thermoplastic polyurethane according to any of embodiments 1 to 8, wherein the thermoplastic polyester (PE-1) has a molecular weight in the range from 1500 g/mol to 60 000 g/mol.

10. Thermoplastic polyurethane according to any of embodiments 1 to 9, wherein the thermoplastic polyester (PE-1) is selected from the group consisting of polyalkylene terephthalates and poly-L-lactic acid.

11. Thermoplastic polyurethane according to any of embodiments 1 to 10, wherein the polyester (PE-1) has a molecular weight in the range from 1000 g/mol to 5000 g/mol.

12. Thermoplastic polyurethane according to any of embodiments 1 to 11, wherein the polyisocyanate is selected from the group consisting of methylene diphenyl diisocyanate and aliphatic diisocyanates.

13. Thermoplastic polyurethane according to any of embodiments 1 to 12, wherein the the thermoplastic polyurethane has a Shore hardness in the range from Shore 45 A to Shore 78 D.

14. Process for producing a thermoplastic polyurethane comprising reaction of an isocyanate composition (I1) comprising at least one polyisocyanate and a polyol composition (P1),
wherein at least one diamine (D1) having a molecular weight in the range from 50 g/mol to 700 g/mol is employed.

15. Process for producing a thermoplastic polyurethane according to embodiment 14 comprising the steps (i) and (ii)
(i) reaction of a thermoplastic polyester (PE-1) with a diamine (D1) to obtain a composition (Z1) comprising an amide (PA-1).
(ii) reaction of the composition (Z1) obtained according to step (i) with an isocyanate composition (I1) comprising at least one polyisocyanate and a polyol composition (P1),
wherein the diamine (D1) has a molecular weight in the range from 50 g/mol to 700 g/mol.

16. Process for producing a thermoplastic polyurethane according to embodiment 14 comprising reaction of the components (a) to (c):
  (a) the isocyanate composition (I1) comprising at least one polyisocyanate,
  (b) the polyol composition (P1) and
  (c) the diamine (D1) as a chain extender.

17. Process according to any of embodiments 14 to 16, wherein the diamine (D1) is employed as a chain extender.

18. Process according to any of embodiments 14 to 17, wherein the diamine (D1) is selected from compounds of general formula (I) or (II):

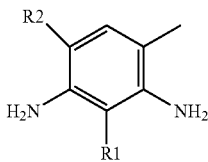

wherein R1 and R2 are independently of one another selected from the group consisting of O—CH₃, CH₂CH₃, S—CH₃, NH—CH₃, N(CH₃)₂ and H,
or

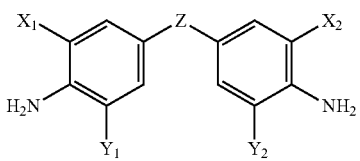

wherein
a) $X_1=X_2=Y_1=Y_2=H$,
b) $X_1=X_2=Y_1=Y_2=CH_3$
c) $X_1=X_2=Y_1=Y_2$=isopropyl
d) $X_1=X_2=Y_1=Y_2=C_2H_5$,
e) $X_1=X_2=Y_1=Y_2$=butyl
f) $X_1X_2=Y_1=Y_2$=tert-butyl,
g) $X_1=X_2=H$ and $Y_1=Y_2=CH_3$,
h) $X_1=X_2=H$ and $Y_1=Y_2$=isopropyl
i) $X_1=X_2=H$ and $Y_1=Y_2=C_2H_5$
j) $X_1=X_2=H$ and $Y_1=Y_2$=butyl or
k) $X_1=X_2=H$ and $Y_1=Y_2$=tert-butyl
and Z is selected from the group consisting of CH₂, CHCH₃, C(CH₃)₂, O and S.

19. Process according to any of embodiments 14 to 18, wherein the diamine (D1) has the general formula (III):

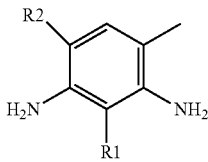

wherein R1=R2=S—CH₂ or R1=R2=CH₂CH₃.

20. Process according to any of embodiments 14 to 19, wherein the polyol composition (P1) comprises at least one polycarbonate polyol (PC1).
21. Process according to any of embodiments 14 to 20, wherein the thermoplastic polyester (PE-1) has a molecular weight in the range from 1500 g/mol to 60 000 g/mol.
22. Process according to any of embodiments 14 to 21, wherein the thermoplastic polyester (PE-1) is selected from the group consisting of polyalkylene terephthalates and poly-L-lactic acid.
23. Process according to any of embodiments 14 to 22, wherein the polyester (PE-1) has a molecular weight in the range from 1000 g/mol to 5000 g/mol.
24. Process according to any of embodiments 14 to 23, wherein the polyisocyanate is selected from the group consisting of methylene diphenyl diisocyanate and aliphatic diisocyanates.
25. Process according to any of embodiments 14 to 24, wherein the thermoplastic polyurethane has a Shore hardness in the range from Shore 45 A to Shore 78 D.
26. Shaped article comprising a thermoplastic polyurethane according to any of embodiments 1 to 13 or a thermoplastic polyurethane obtainable or obtained by a process according to any of embodiments 14 to 25.
27. Shaped article according to embodiment 26, wherein the shaped article is selected from films, moldings, wheels/rollers, fibers, automotive trim, hoses, cable plugs, bellows, trailing cables, cable sheathings, seals, belts or damping elements.
28. Thermoplastic polyurethane obtainable or obtained by a process comprising the steps (i) and (ii):
(i) reaction of a thermoplastic polyester (PE-1) with a diamine (D1) to obtain a composition (Z1) comprising an amide (PA-1),
(ii) reaction of the composition (Z1) obtained according to step (i) with an isocyanate composition (I1) comprising at least one polyisocyanate and a polyol composition (P1),
wherein the diamine (D1) has a molecular weight in the range from 50 g/mol to 700 g/mol and has the general formula (III):

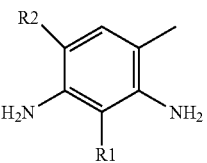

wherein R1=R2=S—CH₃ or R1=R2=CH₂CH₃.

29. Thermoplastic polyurethane according to embodiment 28, wherein the polyol composition (P1) comprises at least one polycarbonate polyol (PC1).
30. Thermoplastic polyurethane according to either of embodiments 28 or 29, wherein the thermoplastic polyester (PE-1) has a molecular weight in the range from 1500 g/mol to 60 000 g/mol.
31. Thermoplastic polyurethane according to any of embodiments 28 to 30, wherein the thermoplastic polyester (PE-1) is selected from the group consisting of polyalkylene terephthalates and poly-L-lactic acid.
32. Thermoplastic polyurethane according to any of embodiments 28 to 31, wherein the polyester (PE-1) has a molecular weight in the range from 1000 g/mol to 5000 g/mol.
33. Thermoplastic polyurethane according to any of embodiments 28 to 32, wherein the polyisocyanate is selected from the group consisting of methylene diphenyl diisocyanate and aliphatic diisocyanates.
34. Thermoplastic polyurethane according to any of embodiments 28 to 33, wherein the the thermoplastic polyurethane has a Shore hardness in the range from Shore 45 A to Shore 78 D.
35. Process for producing a thermoplastic polyurethane comprising the steps (i) and (ii):
(i) reaction of a thermoplastic polyester (PE-1) with a diamine (D1) to obtain a composition (Z1) comprising an amide (PA-1).
(ii) reaction of the composition (Z1) obtained according to step (i) with an isocyanate composition (I1) comprising at least one polyisocyanate and a polyol composition (P1), wherein the diamine (D1) has a molecular weight in the range from 50 g/mol to 700 g/mol and has the general formula (III):

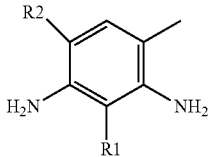

(III)

wherein R1=R2=S—CH$_3$ or R1=R2=CH$_2$CH$_3$.

36. Shaped article comprising a thermoplastic polyurethane according to any of embodiments 28 to 34 or a thermoplastic polyurethane obtainable or obtained by a process according to embodiment 35.

37. Shaped article according to embodiment 36, wherein the shaped article is selected from films, moldings, wheels/rollers, fibers, automotive trim, hoses, cable plugs, bellows, trailing cables, cable sheathings, seals, belts or damping elements.

38. Thermoplastic polyurethane obtainable or obtained by a process comprising reaction of an isocyanate composition (I1) comprising at least one polyisocyanate and a polyol composition (P1),
wherein at least one diamine (D1) having a molecular weight in the range from 50 g/mol to 700 g/mol is reacted with a thermoplastic polyester (PE-1) to afford an amide (PA-1) before reaction with the isocyanate composition (I1) and the polyol composition (P1).

39. Thermoplastic polyurethane according to embodiment 38, wherein the process comprises the steps (i) and (ii):
(i) reaction of a thermoplastic polyester (PE-1) with a diamine (D1) to obtain a composition (Z1) comprising an amide (PA-1),
(ii) reaction of the composition (Z1) obtained according to step (i) with an isocyanate composition (I1) comprising at least one polyisocyanate and a polyol composition (P1),
wherein the diamine (D1) has a molecular weight in the range from 50 g/mol to 700 g/mol.

40. Thermoplastic polyurethane according to either of embodiments 38 or 39, wherein the diamine (D1) is selected from compounds of general formula (I) or (II):

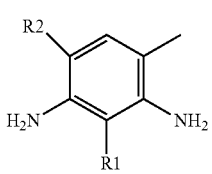

(I)

wherein R1 and R2 are independently of one another selected from the group consisting of O—CH$_3$, CH$_2$CH$_3$, S—CH$_3$, NH—CH$_3$, N(CH$_3$)$_2$ and H, or

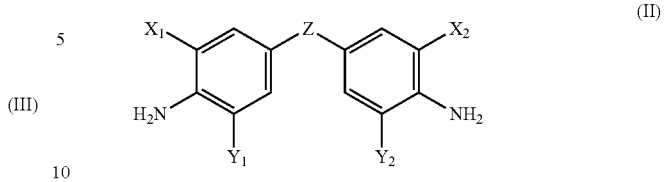

(II)

wherein
a) $X_1=X_2=Y_1=Y_2=H$,
b) $X_1=X_2=Y_1=Y_2=CH_3$
c) $X_1=X_2=Y_1=Y_2$=isopropyl
d) $X_1=X_2=Y_1=Y_2=C_2H_5$,
e) $X_1=X_2=Y_1=Y_2$=butyl
f) $X_1=X_2=Y_1=Y_2$=tert-butyl,
g) $X_1=X_2=H$ and $Y_1=Y_2=CH_3$,
h) $X_1=X_2=H$ and $Y_1=Y_2$=isopropyl
i) $X_1=X_2=H$ and $Y_1=Y_2=C_2H_5$
j) $X_1=X_2=H$ and $Y_1=Y_2$=butyl or
k) $X_1=X_2=H$ and $Y_1=Y_2$=tert-butyl
and Z is selected from the group consisting of CH$_2$, CHCH$_3$, C(CH$_3$)$_2$, O and S.

41. Thermoplastic polyurethane according to any of embodiments 38 to 40, wherein the diamine (D1) has the general formula (III):

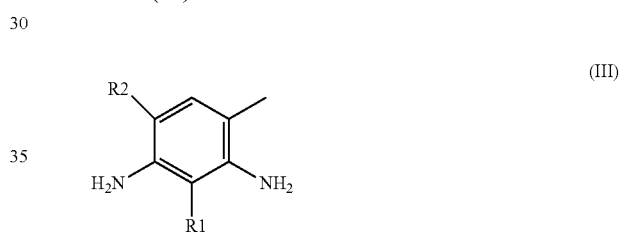

(III)

wherein R1=R2=S—CH$_3$ or R1=R2=CH$_2$CH$_3$.

42. Thermoplastic polyurethane according to any of embodiments 38 to 41, wherein the polyol composition (P1) comprises at least one polycarbonate polyol (PC1).

43. Thermoplastic polyurethane according to any of embodiments 38 to 42, wherein the thermoplastic polyester (PE-1) has a molecular weight in the range from 1500 g/mol to 60 000 g/mol.

44. Thermoplastic polyurethane according to any of embodiments 38 to 43, wherein the thermoplastic polyester (PE-1) is selected from the group consisting of polyalkylene terephthalates and poly-L-lactic acid.

45. Thermoplastic polyurethane according to any of embodiments 38 to 44, wherein the polyester (PE-1) has a molecular weight in the range from 1000 g/mol to 5000 g/mol.

46. Thermoplastic polyurethane according to any of embodiments 38 to 45, wherein the polyisocyanate is selected from the group consisting of methylene diphenyl diisocyanate and aliphatic diisocyanates.

47. Thermoplastic polyurethane according to any of embodiments 38 to 46, wherein the the thermoplastic polyurethane has a Shore hardness in the range from Shore 45 A to Shore 78 D.

48. Process for producing a thermoplastic polyurethane comprising reaction of an isocyanate composition (I1) comprising at least one polyisocyanate and a polyol composition (P1), wherein at least one diamine (D1) having a molecular weight in the range from 50 g/mol to 700 g/mol is reacted with a thermoplastic polyester (PE-1) to afford an amide (PA-1) before reaction with the isocyanate composition (I1) and the polyol composition (P1).

49. Process for producing a thermoplastic polyurethane comprising reaction of an isocyanate composition (I1) comprising at least one polyisocyanate and a polyol composition (P1) according to embodiment 48 comprising the steps (i) and (ii):
   (i) reaction of a thermoplastic polyester (PE-1) with a diamine (D1) to obtain a composition (Z1) comprising an amide (PA-1),
   (ii) reaction of the composition (Z1) obtained according to step (i) with an isocyanate composition (I1) comprising at least one polyisocyanate and a polyol composition (P1),
   wherein the diamine (D1) has a molecular weight in the range from 50 g/mol to 700 g/mol.

50. Shaped article comprising a thermoplastic polyurethane according to any of embodiments 38 to 47 or a thermoplastic polyurethane obtainable or obtained by a process according to embodiment 48 or 49.

51. Shaped article according to embodiment 50, wherein the shaped article is selected from films, moldings, wheels/rollers, fibers, automotive trim, hoses, cable plugs, bellows, trailing cables, cable sheathings, seals, belts or damping elements.

The examples that follow serve to illustrate the invention, but are in no way limiting with respect to the subject matter of the present invention.

EXAMPLES

1. Input Materials

PC polyol: Polycarbonate polyol
E1195 A: Standard TPU (benchmark), Elastollan 1195 A, thermoplastic polyether-based polyurethane, available from BASF Polyurethanes
785 A HPM: Standard HPM TPU (Benchmark), Elastollan 785 A HPM, thermoplastic polyether-based polyurethane, available from BASF Polyurethanes
Ethacure 300 dimethylthiotoluenediamine (E300)
Ethacure 100 diethyltoluenediamine (E100)

2. General Production Example 2.1 Synthesis is carried out by reactive extrusion in a self-cleaning twin-screw extruder according to the process described in EP1419188B1. The twin-screw extruder having a ratio of screw length to screw diameter of 48 achieves residence times of at least 40 s, preferably more than 60 s. The polymer melt obtained after transamidation and subsequent chain synthesis is processed into pellet materials by underwater or strand pelletization.

2.2 Various samples were investigated in respect of their mechanical properties. Compositions comprising thermoplastic polyurethanes and dimethylthiotoluenediamine/diethyltoluenediamine were produced in a one-shot process or by means of a prepolymer process.

The one-shot process comprised employing all components (diisocyanates (a), polyol (b), chain extender (c) and catalyst (e)) in a first zone of the extruder. The temperature was adjusted to a range from 150° C. to 230° C. at 200 rpm. After commixing of the components and reaction for at least 40 s, preferably at least 60 s, a pellet material was obtained from the polymer melt by strand granulation or underwater pelletization.

The semi-prepolymer process comprised initially employing diisocyanates (a), polyol (b), chain extender (c) and catalyst (e) in a first zone of the extruder. After commixing and pre-reaction of these input materials further chain extender was added in the third or fifth zone. After reaction for at least 40 s, preferably at least 60 s, a pellet material was obtained from the polymer melt by strand pelletization or underwater pelletization.

2.3 Conditions for aging

SI test specimens were stored in a convection oven for the specified time at the appropriate temperature. After the heat treatment they were removed and cooled to room temperature. The mechanical examinations were carried out on the thus-treated samples.

The examination with respect to aging shows that the thermoplastic polyurethanes according to the invention having a different hard segment proportion and produced using dimethylthiotoluenediamine or diethyltoluenediamine were dimensionally stable after storage at 180° C., 190° C. and 200° C. for 6 hours and the flexibility of the material was retained. They moreover retained even more than 50% of their original breaking elongation after storage at 150° C. for 3000 hours. The materials thus meet the requirements of the T4 standard for applications in the automotive sector.

3. Examples 3.1 Production of the examples specified hereinbelow was carried out in a ZSK58 MC twin-screw extruder from Coperion, having a processing length of 48 D (12 barrels). The melt was discharged from the extruder by means of a gear pump. After melt filtration the polymer melts were processed by underwater pelletization into pellets which were continuously dried to water contents of below 0.03% in a heated fluidized bed at 60-90° C.

The polybutylene terephthalate Ultradur B4500 from BASF SE was metered into the first zone. Once the PBT had melted the reagent for transamidation, for example Etacure 100, and optionally a catalyst were supplied in the third zone. Once transamidation was complete the further reaction components, such as diisocyanate and polyols, were added in the fifth zone. The addition of further additives was carried out in zone 8. Melt discharging and underwater pelletization were carried out at melt temperatures of 220-230° C.

The barrel temperatures for the feed section, zone 1, are 150° C. Melting and transesterification, zones 2-5, are carried out at temperatures of 250-300° C. Synthesis of the polymer in zones 6-12 is carried out at barrel temperatures of 240-210° C. The screw speed is between 180 and 240 rpm. The throughput is in the range of 180-220 kg/h.

3.2 Compositions
Example 1 E1195 A with BDO
Example 2 Polycarbonate polyol HPM TPU+E100, (97 A)
Example 3 785 A HPM TPU with BDO
Example 4 Polycarbonate polyol HPM TPU+E100, (92 A)
Example 5 Aliphatic HPM with E100, (86 A)
Beispiel 6 Polycarbonate polyol aromatic TPU+E300

4. Results

4.1 Overview of aging characteristics for cable applications (class D):

| Sample | Aging at 150° C./ 3000 h | Aging at 150° C./ 3000 h | Aging at 150° C./ 3000 h | Aging at 150° C./ 3000 h | Breaking elongation after aging >50% | Tensile strength before aging A20 MPa |
|---|---|---|---|---|---|---|
| Example 1 | − | − | − | − | − | + |
| Example 2 | + | + | + | + | + | + |
| Example 3 | + | + | − | − | − | + |

4.2 Overview of aging characteristics for cable applications (class E, 240° C., 6 hours):

| Sample | Breaking elongation before aging (%) | Breaking elongation after aging (%) |
|---|---|---|
| Example 2 | 430 | 80 |
| Example 3 | 620 | melted |

5. Results after Storage

5.1 Storage at 150° C., 3000 hours

| Composition | Sample | Tensile strength before aging (MPa) | Tensile strength after aging | Breaking elongation before aging (%) | Breaking elongation after aging |
|---|---|---|---|---|---|
| aromatic: HPM with E100 | Example 4 | 31 | 16 | 40 | 150 |
| aromatic HPM with E100 | Example 2 | 35 | 20 | 430 | 90 |
| aliphatic HPM with E100 | Example 5 | 16 | 5 | 360 | 110 |
| 785A HPM | Benchmark | 45 | 11 | 620 | 100 |

5.2 Storage at 175° C., 85% R.H., 10 days

| Composition | Sample | Tensile strength before aging (MPa) | Tensile strength after aging | Breaking elongation before aging (%) | Breaking elongation after aging |
|---|---|---|---|---|---|
| E1195A with BDO | Standard reference | 55 | melted | 600 | melted |
| PC polyol TPU + Ethacure 300 + MD | Example 6 | 13 | 10 | 360 | 200 |
| aromatic HPM E100 | Example 4 | 31 | 14 | 450 | 230 |
| aromatic HPM with E100 | Example 2 | 35 | 16 | 430 | 150 |
| aliphatic (HDI) HPM with E100 | Example 5 | 16 | 3 | 360 | 80 |
| 785A HPM mil BDO | Benchmark | 45 | 20 | 620 | 190 |

5.3 Storage at 200° C., 6 hours

| Composition | Sample | Tensile strength before aging (MPa) | Tensile strength after aging | Breaking elongation before aging (%) | Breaking elongation after aging |
|---|---|---|---|---|---|
| E1195A with BDO | Standard Ref | 55 | melted | 650 | melted |
| Comparison 1 with E100 | Reference 1 | 9 | 3 | 680 | 1020 |
| Comparison 2 with E100 | Reference 2 | 14 | 7 | 440 | 680 |
| Comparison 3 with E100 | Reference 3 | 15 | 6 | 360 | 310 |
| PC polyol TPU + Ethacure 300 +MDI | Example 6 | 13 | 8 | 360 | 100 |
| aromatic: HPM E100 | Example 4 | 31 | 10 | 450 | 300 |
| aromatic HPM with E100 | Example 2 | 35 | 13 | 430 | 290 |
| aliphatic HPM with E100 | Example 5 | 16 | 9 | 360 | 190 |
| 785A HPM with BDO | Benchmark | 45 | melted | 620 | melted |

5.4 Storage at 85° C., 85% R.H., 3000 hours

| Composition | Sample | Tensile strength before aging (MPa) | Tensile strength after aging | Breaking elongation before aging (%) | Breaking elongation after aging | Shore hardness |
|---|---|---|---|---|---|---|
| aromatic HPM with E100 | Example 4 | 31 | 6 | 450 | 80 | 92A |
| aromatic HPM with E100 | Example 2 | 35 | 8 | 430 | 80 | 97A |
| aliphatic HPM with E100 | Example 5 | 16 | 5 | 360 | 80 | 86A |
| 785A HPM | Benchmark | 45 | 3 | 620 | 30 | 85A |

6. The following properties of the polyurethanes obtained were determined by the methods specified:
Shore hardness: DIN ISO 7619-1
Tensile strength and elongation at break: DIN 53504
Tear propagation resistance: DIN ISO 34-1, B (b)
Abrasion measurement: DIN ISO 4649
Density: DIN EN ISO 1183-1, A
Compression set DIN ISO 815

CITED LITERATURE

Kunststoffhandbuch, volume VII, edited by Vieweg and Höchtlen, Carl Hanser Verlag, Munich 1966 (p. 103-113)
EP 1 419 188 B1

The invention claimed is:
1. A thermoplastic polyurethane, obtained by a process comprising:
reacting at least one diamine (D1), having a molecular weight in the range from 50 g/mol to 700 g/mol, with a thermoplastic polyester (PE-1), to obtain an amide (PA-1), and
reacting an isocyanate composition (I1) comprising at least one polyisocyanate, the amide (PA-1), and a polyol composition (P1).

2. The thermoplastic polyurethane according to claim 1, wherein the process comprises (i) and (ii):
(i) reacting the thermoplastic polyester (PE-1) with the at least one diamine (D1), to obtain a composition (Z1) comprising the amide (PA-1),
(ii) reacting the composition (Z1) obtained in (i) with the isocyanate composition (I1) comprising at least one polyisocyanate, and the polyol composition (P1).

3. The thermoplastic polyurethane according to claim 1, wherein the at least one diamine (D1) is selected from the group consisting of compounds of formula (I) or (II):

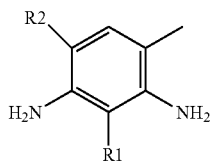
(I)

wherein R1 and R2 are independently of one another selected from the group consisting of O—CH$_3$, CH$_2$CH$_3$, S—CH$_3$, NH—CH$_3$, N(CH$_3$)$_2$, and H, or

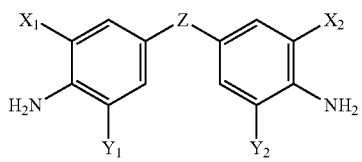
(II)

wherein
a) $X_1=X_2=Y_1=Y_2=H$,
b) $X_1=X_2=Y_1=Y_2=CH_3$,
c) $X_1=X_2=Y_1=Y_2=$isopropyl,
d) $X_1=X_2=Y_1=Y_2=C_2H_5$,
e) $X_1=X_2=Y_1=Y_2=$butyl,
f) $X_1=X_2=Y_1=Y_2=$tert-butyl,
g) $X_1=X_2=H$ and $Y_1=Y_2=CH_3$,
h) $X_1=X_2=H$ and $Y_1=Y_2=$isopropyl,
i) $X_1=X_2=H$ and $Y_1=Y_2=C_2H_5$,
j) $X_1=X_2=H$ and $Y_1=Y_2=$butyl, or
k) $X_1=X_2=H$ and $Y_1=Y_2=$tert-butyl; and
Z is selected from the group consisting of CH$_2$, CHCH$_3$, C(CH$_3$)$_2$, O, and S.

4. The thermoplastic polyurethane according to claim 1, wherein the at least one diamine (D1) has the formula (III):

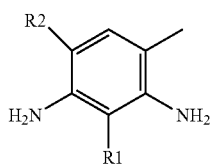
(III)

wherein R1=R2=S—CH$_3$ or R1=R2=CH$_2$CH$_3$.

5. The thermoplastic polyurethane according to claim 1, wherein the polyol composition (P1) comprises at least one polycarbonate polyol (PC1).

6. The thermoplastic polyurethane according to claim 1, wherein the thermoplastic polyester (PE-1) has a molecular weight in the range from 1500 g/mol to 60000 g/mol.

7. The thermoplastic polyurethane according to claim 1, wherein the thermoplastic polyester (PE-1) is selected from the group consisting of a polyalkylene terephthalate and poly-L-lactic acid.

8. The thermoplastic polyurethane according to claim 1, wherein the thermoplastic polyester (PE-1) has a molecular weight in the range from 1000 g/mol to 5000 g/mol.

9. The thermoplastic polyurethane according to claim 1, wherein the at least one polyisocyanate is selected from the group consisting of methylene diphenyl diisocyanate and an aliphatic diisocyanate.

10. The thermoplastic polyurethane according to claim 1, wherein the thermoplastic polyurethane has a Shore hardness in the range from Shore 45 A to Shore 78 D.

11. A process for producing a thermoplastic polyurethane, the process comprising:
reacting at least one diamine (D1), having a molecular weight in the range from 50 g/mol to 700 g/mol, with a thermoplastic polyester (PE-1), to obtain an amide (PA-1), and
reacting an isocyanate composition (I1) comprising at least one polyisocyanate, the amide (PA-1), and a polyol composition (P1).

12. The process for producing a thermoplastic polyurethane according to claim 11, the process comprising (i) and (ii):
(i) reacting the thermoplastic polyester (PE-1) with the at least one diamine (D1), to obtain a composition (Z1) comprising the amide (PA-1),
(ii) reacting the composition (Z1) obtained in (i) with the isocyanate composition (I1) comprising at least one polyisocyanate, and the polyol composition (P1).

13. A shaped article, comprising the thermoplastic polyurethane according to claim 1.

14. The shaped article according to claim 13, wherein the shaped article is selected from the group consisting of a film, a molding, a wheel/roller, a fiber, an automotive trim, a hose, a cable plug, a bellow, a trailing cable, a cable sheathing, a seal, a belt, and a damping element.

15. A shaped article, comprising the thermoplastic polyurethane obtained by the process according to claim 11.

16. The shaped article according to claim 15, wherein the shaped article is selected from the group consisting of a film, a molding, a wheel/roller, a fiber, an automotive trim, a hose, a cable plug, a bellow, a trailing cable, a cable sheathing, a seal, a belt, and a damping element.

* * * * *